(12) United States Patent
Fan

(10) Patent No.: US 7,621,547 B1
(45) Date of Patent: Nov. 24, 2009

(54) OCCUPANT-PEDALED DRIVE MECHANISM FOR SCOOTER

(76) Inventor: Ronnie Chee Keung Fan, 1082 Leland Dr., Lafayette, CA (US) 94549

(*) Notice: Subject to any disclaimer, the term of this patent is extended or adjusted under 35 U.S.C. 154(b) by 351 days.

(21) Appl. No.: 11/491,587

(22) Filed: Jul. 24, 2006

(51) Int. Cl.
*B62M 1/04* (2006.01)

(52) U.S. Cl. ............. 280/221; 280/210; 280/252; 280/87.1; 280/257

(58) Field of Classification Search ......... 280/220–222, 280/210, 252, 87.01, 253, 256, 257
See application file for complete search history.

(56) References Cited

U.S. PATENT DOCUMENTS

| | | | | |
|---|---|---|---|---|
| 833,314 A * | 10/1906 | Fothergill | .......... | 280/257 |
| 1,391,165 A * | 9/1921 | Best | .......... | 280/7.17 |
| 1,540,170 A * | 6/1925 | Frick | .......... | 180/65.6 |
| 1,600,646 A * | 9/1926 | Stetson | .......... | 280/221 |
| 1,690,342 A * | 11/1928 | Madsen | .......... | 280/257 |
| 1,798,971 A * | 3/1931 | Clements | .......... | 280/215 |
| 1,977,035 A * | 10/1934 | Benjamin | .......... | 280/221 |
| 6,241,269 B1 * | 6/2001 | Fan | .......... | 280/265 |
| 6,270,102 B1 * | 8/2001 | Fan | .......... | 280/252 |
| 6,402,173 B1 * | 6/2002 | Chiu | .......... | 280/252 |
| 6,857,648 B2 * | 2/2005 | Mehmet | .......... | 280/217 |
| 2003/0098566 A1 * | 5/2003 | Christensen et al. | .......... | 280/221 |

* cited by examiner

*Primary Examiner*—Lesley Morris
*Assistant Examiner*—Maurice Williams
(74) *Attorney, Agent, or Firm*—Howard Cohen

(57) ABSTRACT

A scooter propulsion mechanism includes a pedal secured to the upper surface of the platform and a rigid link pivotally connected from the pedal to the mechanism components mounted on the bottom surface of the platform. Approximately one-half of the propulsion mechanism is located at one side of the rear wheel, and the other one-half is located at the other side of the rear wheel. The mechanism in one embodiment includes a plurality of gear wheels to increase rotational speed, and in another embodiment a plurality of sprocket wheels joined by chain loops, in both cases to drive the rear wheel and propel the scooter. A slot in the platform allows the larger sprocket wheels or gear wheels to project upwardly therethrough, so that there is sufficient ground clearance for safe riding.

5 Claims, 3 Drawing Sheets

OCCUPANT-PEDALED DRIVE MECHANISM FOR SCOOTER

CROSS-REFERENCE TO RELATED APPLICATIONS

This application is based on material described in Disclosure Document no. 591,944, received in the US Patent and Trademark Office on Dec. 19, 2005.

FEDERALLY SPONSORED RESEARCH

Not applicable.

SEQUENCE LISTING, ETC ON CD

Not applicable.

BACKGROUND OF THE INVENTION

1. Field of the Invention

This invention relates to an occupant powered scooter and, more particularly, to a pedal drive system for a scooter.

2. Description of Related Art

Skateboards and scooters have become ubiquitous in many parts of the world, due to the plethora of new designs and features that have been introduced in recent years. Accompanying the introduction of high performance bearings and wheels at affordable prices, an entirely new recreational field has been created for children and adults.

Skateboards and scooters share some common features, including a platform on which the rider is supported, and front and rear wheels for supporting the platform for rolling on a smooth surface. A scooter is generally distinguished from a skateboard by the provision of steerable front wheels that are controlled by a tiller or handlebar, whereas a skateboard is steered by shifting weight and thrust of the rider. In both forms of transport, it is common for the rider to propel the vehicle by supporting the rider's weight with one foot on the platform, and reaching the other foot to the ground and pushing rearwardly to create forward motion. However, as ground speed increases, the propelling foot must push against a ground surface that is receding rearwardly at a rapid rate. Thus the force of propulsion by foot diminishes as the vehicle speed increases, and it becomes increasingly difficult to exceed a rather low maximum velocity on a flat surface. (Downhill speed is limited by other factors, such as air resistance, wheel resistance, and the like.)

This inherent limitation in direct foot propulsion has been addressed in the prior art. U.S. Pat. Nos. 6,079,727; 6,131,933; 6,241,269; and 6,270,102 all issued to the present inventor, describe mechanisms for propulsion of skateboards and scooters of various configurations. The present invention represents further improvements over these prior art devices.

One problem common to these vehicles is that the propulsion mechanism may extend below the platform that supports the rider. The platform must be close to the ground to avoid instability, and the depending mechanism reduces ground clearance and increases the probability of collision with small obstacles such as curbs, bumps, holes, or uneven pavement. On the other hand, placing the mechanism on top of the platform concomitantly reduces the area on which the rider may stand. Furthermore, the mechanism must be protected from the rider's feet, and vice versa. Another problem common to these vehicles is that the driving mechanism is mounted on one side of the longitudinal axis of the platform, thus causing instability of the vehicle due to uneven weight distribution of the driving components.

BRIEF SUMMARY OF THE INVENTION

The present invention generally comprises a propulsion apparatus for a scooter that overcomes the maximum velocity problem of direct foot propulsion, and provides a mechanism that is effective, lightweight, and easy to use. A salient attribute of the mechanism is that it is arranged to place its components on both sides of the rear wheel of the scooter so that it is more symmetrically balanced with respect to the longitudinal axis of the vehicle.

The scooter includes a longitudinally extending platform to support the rider, and a chassis secured to the platform and joined to a front wheel steering assembly. A rear wheel is mounted at the back end of the platform and connected to the vehicle propulsion mechanism. Although the invention will be described with reference to a steerable front wheel and fixed-direction rear wheel, it may be appreciated that these functions may be transposed, with the rear wheel being steerable and the front wheel being connected to the propulsion mechanism.

The propulsion mechanism includes a slot extending vertically through the platform, and the rear wheel is secured on an axle that is mounted on the bottom surface of the platform, so that the rear wheel includes a portion projecting upwardly through the slot. A pedal is pivotally secured to the upper surface of the platform and resiliently biased to rotate upwardly at an oblique angle. A rigid link is pivotally connected to the pedal, and is also pivotally connected by an eccentric mounting pin to the propulsion mechanism, so that reiterative depression of the pedal by the vehicle rider will power the mechanism and propel the vehicle.

In one embodiment the propulsion mechanism includes a first gear wheel secured on a first axle mounted on the bottom surface of the platform, forward of the rear wheel, with a portion of the first gear wheel projecting upwardly through the slot. The link is pivotally joined to the first gear wheel, so that actuation of the pedal rotates the first gear wheel. A second axle is mounted on the bottom surface of the platform rearwardly of the first axle, and a second gear wheel is secured on the second axle and adapted to mesh with the first gear wheel and rotate the second axle. Both the first and second gear wheels are oriented generally vertically and are disposed in a plane that is offset to one side of the rear wheel.

A third gear wheel is secured to the second axle and arranged to rotate in common therewith. A fourth gear wheel is secured to the wheel axle and arranged to mesh with the third gear wheel, so that the third gear wheel causes the wheel axle to revolve and rotate the rear wheel, thereby driving the scooter forward. Both the third and fourth gear wheels are oriented generally vertically and are disposed in a plane that is offset to the other side of the rear wheel. Thus approximately one-half of the propulsion mechanism is located at one side of the rear wheel, and the other one-half is located at the other side of the rear wheel. The first gear wheel is greater in diameter that the second gear wheel, and the third gear wheel is greater in diameter that the fourth gear wheel, whereby the rotational speed of the fourth gear wheel is substantially increased with respect to the first gear wheel. The slot in the platform allows the larger gear wheels to project upwardly therethrough, so that there is sufficient ground clearance for safe riding.

In another embodiment the propulsion mechanism includes a first sprocket wheel secured on a first axle mounted on the bottom surface of the platform, forward of the rear wheel, with a portion of the first sprocket wheel extending upwardly through the slot. The link is pivotally joined to the first sprocket wheel to rotate the first sprocket wheel as the pedal is reiteratively depressed. A second axle is mounted on the bottom surface of the platform rearwardly of the rear wheel, and a second sprocket wheel is secured on the second axle. A first chain loop is secured about the first and second sprocket wheels to rotate the second axle when the pedal is being reiteratively depressed. Both the first and second sprocket wheels are oriented generally vertically and are disposed in a plane that is offset to one side of the rear wheel.

A third sprocket wheel is joined to the second axle for rotation in common therewith, and a fourth sprocket wheel is secured to the wheel axle in alignment with the third sprocket wheel. A second chain loop is secured about the third and fourth sprocket wheels to rotate the wheel axle and the rear wheel, driving the scooter forward. Both the third and fourth sprocket wheels are oriented generally vertically and are disposed in a plane that is offset to the other side of the rear wheel. Thus approximately one-half of the propulsion mechanism is located at one side of the rear wheel, and the other one-half is located at the other side of the rear wheel. The first sprocket wheel is greater in diameter that the second sprocket wheel, and the third sprocket wheel is greater in diameter that the fourth sprocket wheel, whereby the rotational speed of the fourth sprocket wheel is substantially increased with respect to the first sprocket wheel. The slot in the platform allows the larger sprocket wheels to project upwardly therethrough, so that there is sufficient ground clearance for safe riding.

In both embodiments the propulsion mechanism may be provided with a freewheel device that enables the rear wheel to turn freely and glide when the wheel velocity exceeds the wheel shaft velocity. This addition stops the pedal from being driven reciprocally by the rotating rear wheel when the scooter is gliding or rolling freely without requiring propulsion power. Likewise, either embodiment may be provided with a brake pedal that is connected to a caliper brake assembly associated with either the front or rear wheel. Furthermore, the scope of the invention includes a combination of the two embodiments, in which a sprocket wheel and chain loop arrangement is combined with a gear wheel arrangement to deliver rotational power to the rear wheel.

DETAILED DESCRIPTION OF THE INVENTION

Figure 1:
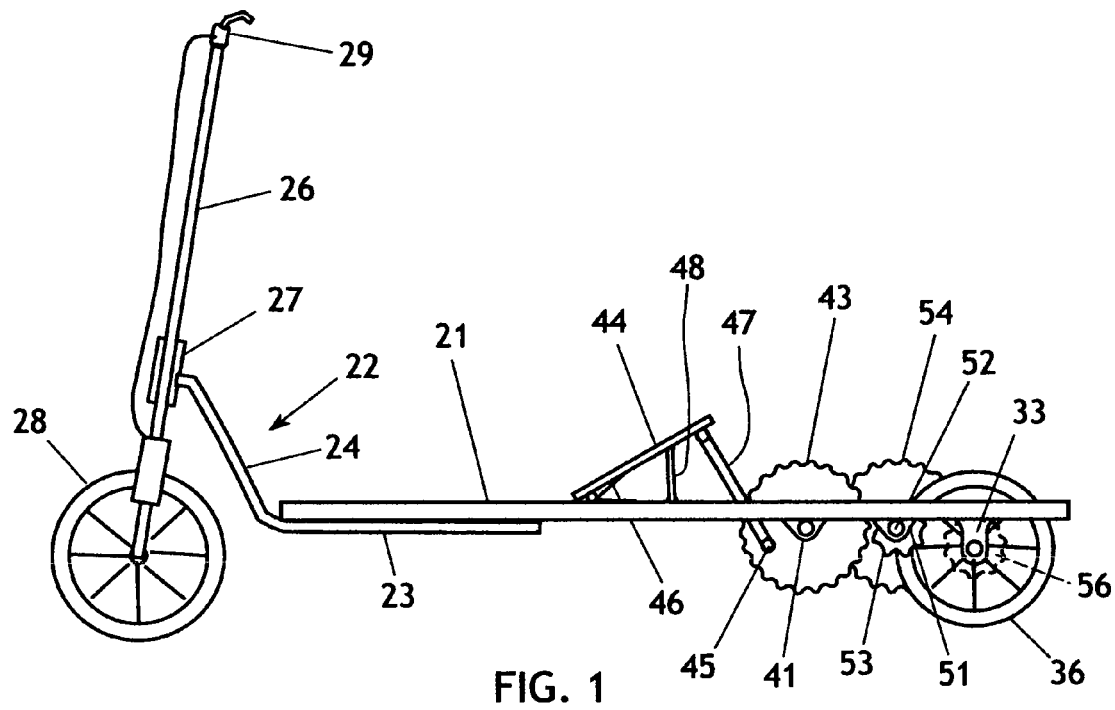
FIG. 1 is a side elevation of one embodiment of the mechanically driven scooter of the present invention.
Figure 2:
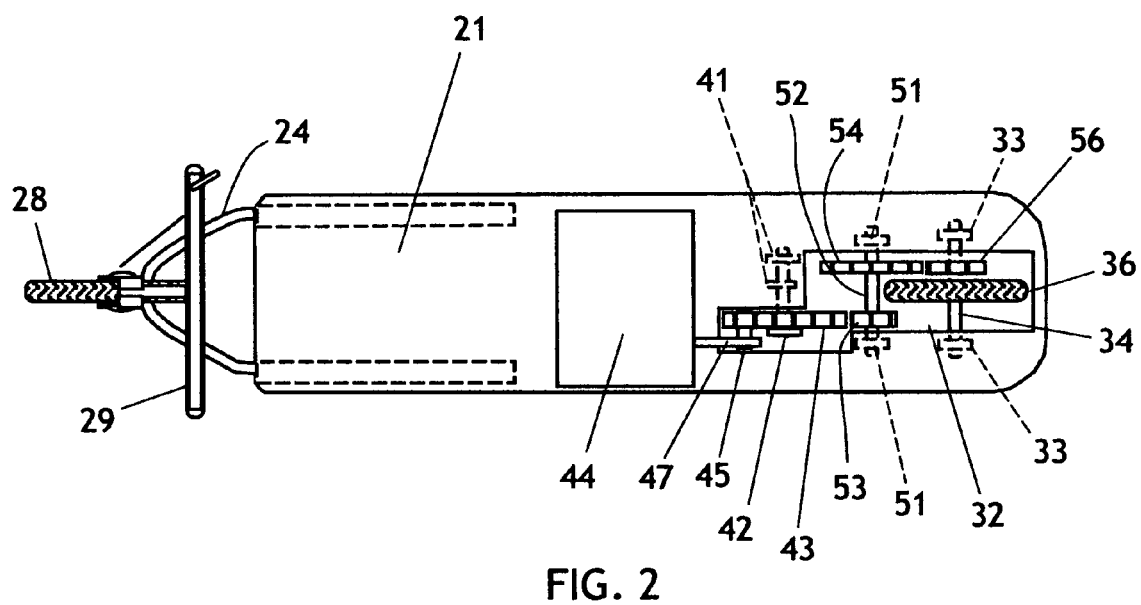
FIG. 2 is a plan view of the embodiment of the mechanically driven scooter shown in FIG. 1.
Figure 5:
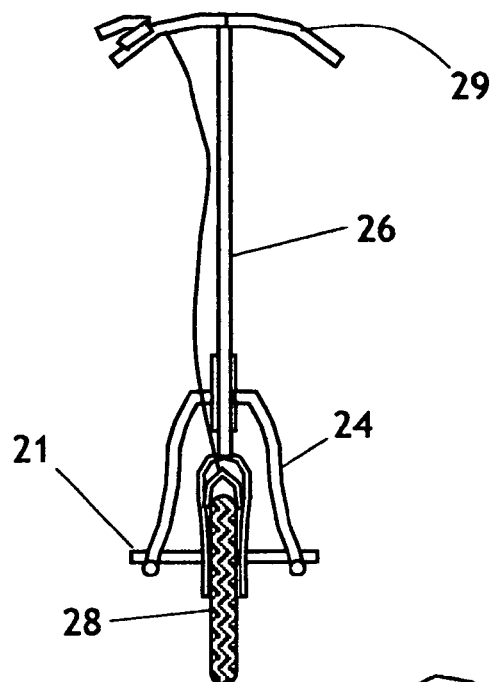
FIG. 5 is a front elevation of the mechanically driven scooter of the present invention.

The present invention generally comprises a propulsion apparatus for a scooter that overcomes the maximum velocity problem of direct foot propulsion, and provides a mechanism that is effective, lightweight, and easy to use. With regard to FIGS. 1, 2, and 5, one embodiment of the invention includes a footboard or platform 21 extending longitudinally and dimensioned to enable a rider to stand comfortably thereupon. A wishbone frame 22 includes parallel distal ends 23 secured to the bottom surface of the forward end of the platform 21, and a proximal portion 24 extending obliquely upwardly. A steering tube 26 is supported in a bracket 27 secured to the proximal portion 24 of the frame, and a front wheel 28 is mounted on a fork at the lower end of the steering tube 26. A handlebar 29 is mounted at the upper end of the steering tube 26 to enable a rider to control and turn the front wheel 28. The components enumerated above are generally known in the prior art, and are described in the patents referenced above.

The propulsion mechanism 31 that is the focus of the present invention includes an irregular slot 32 extending vertically through a rear portion of the platform 21. A pair of bearing blocks 33 are mounted on the bottom surface of the platform 21, disposed at laterally opposed sides of the slot 32, and are adapted to support a wheel axle 34 extending therebetween. The bearing blocks 33 are extended longer than the bearing blocks 41 and 51. The added length lifts the platform 21 higher off the ground and thus provides more clearance between gears 43 and 54 and the ground. A rear wheel 36 is supported medially on the axle 34 and is oriented in a vertical plane along a longitudinal axis of the vehicle. Note that a portion of the rear wheel 36 projects upwardly through the slot 32. A freewheel assembly (not shown) may be used to mount the wheel to the axle 34, whereby the wheel will rotate freely when its rotational speed exceeds the rotational speed of axle, as is well known in the bicycle arts.

A pair of bearing blocks 41 are secured to the bottom surface of the platform 21, adjacent to one side of the forward end of the slot 32. The bearing blocks 41 support a first axle 42 that extends horizontally to span a portion of the slot 32, and a first gear wheel 43 is mounted on the axle 42 and disposed in the slot 32. A portion of the gear wheel 43 projects upwardly through the slot 32. A pedal 44 is pivotally secured to the upper surface of the platform 21, and a spring 46 is provided to resiliently bias the pedal to rotate and extend obliquely upwardly. A flexible tension link 48 connects the pedal 44 and platform 21, which limits rotation of the pedal 44 when biased by the spring 46, and rests the pedal 44 at an optimum angle for depression. The pedal 44 is mounted approximately medially with respect to the length of the platform 21. The pedal is shown as a rectangular panel; however, it may be configured in any shape that may be convenient to the stance of the rider supported on the platform. A rigid link 47 is pivotally secured at one end to the bottom surface of the pedal, and at the other end it is pivotally joined by an eccentric mounting pin 45 to the gear wheel 43. Reiterative depression of the pedal by the vehicle rider will rotate the gear wheel 43.

Another pair of bearing blocks 51 are secured to the bottom surface of the platform 21 and disposed at laterally opposed sides of the slot 32, and are adapted to support a second axle 52 extending therebetween. The axle 52 is disposed medially between the axles 34 and 42, and supports a gear wheel 53 aligned with gear wheel 43 and disposed to mesh therewith. Another gear wheel 54 is secured to the axle 52, and is aligned with another gear wheel 56 secured on the wheel axle 34. Note that gear wheel 43 is larger than gear wheel 53, whereby the rotational speed of gear wheel 43 is multiplied; and gear wheel 54 is larger than gear wheel 56, whereby the rotational speed of gear wheel 54 is multiplied. Thus the gears 43, 53, 54, and 56 rotate the wheel 36 at an angular velocity substantially greater than the angular velocity of gear wheel 43, enabling the scooter to travel at a relatively high speed along the ground. The slot 32 allows the larger gear wheels 43 and 54 to project upwardly therethrough, so that there is sufficient ground clearance for safe riding. Moreover, approximately one-half of the propulsion mechanism is located at one side of the rear wheel 36, and the other one-half is located at the other side of the rear wheel, whereby the propulsion mechanism is balanced laterally with respect to the platform 21. This laterally balanced arrangement provides a compact mechanism, whereby the overall dimensions of the scooter assembly are not unduly large.

Figure 6:
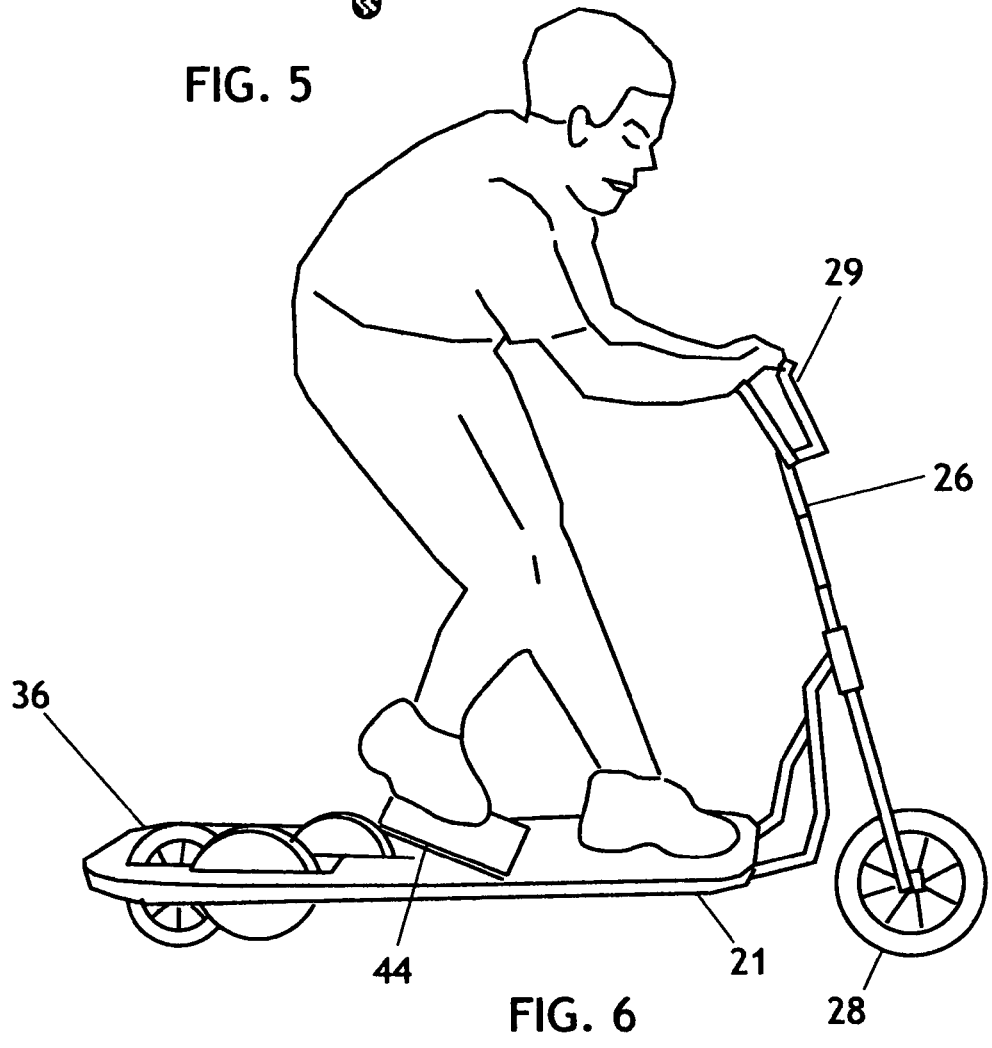
FIG. 6 is a perspective view of the embodiment of FIGS. 1 and 2, shown in use with a rider propelling the scooter.

As shown in FIG. 6, the rider is supported in a standing deportment on the platform 21, with one foot on the pedal and the other supporting the weight of the rider on the platform (either foot may serve either function). The handlebar is gripped by the rider to steer the scooter and the pedal is pumped reiteratively to drive the scooter forward.

Figure 3:
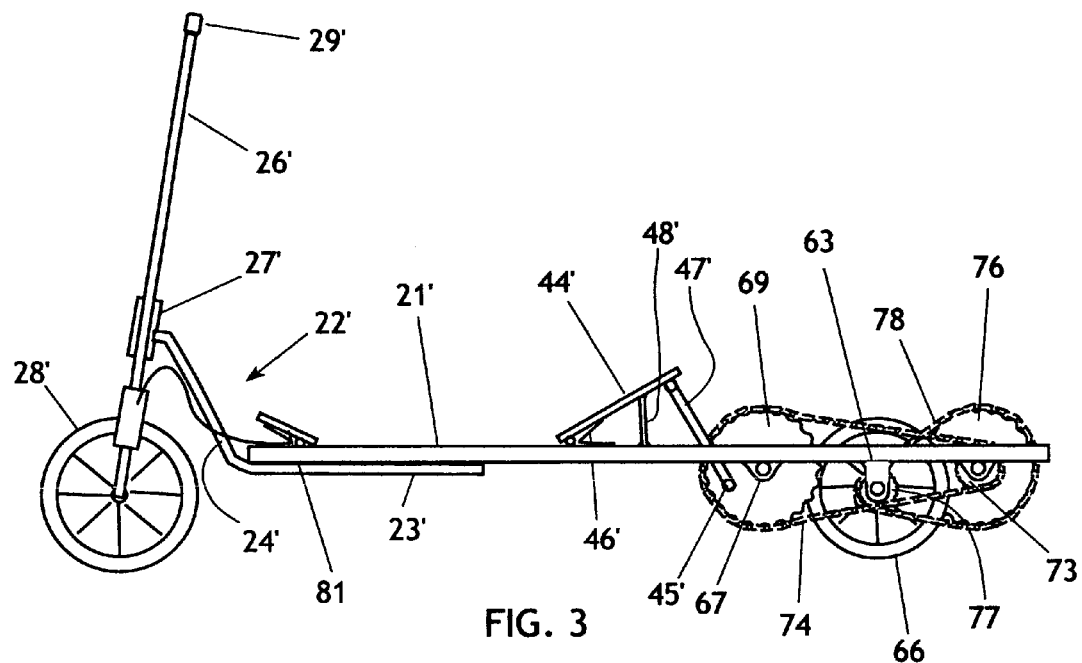
FIG. 3 is a side elevation of another embodiment of the mechanically driven scooter of the present invention.
Figure 4:
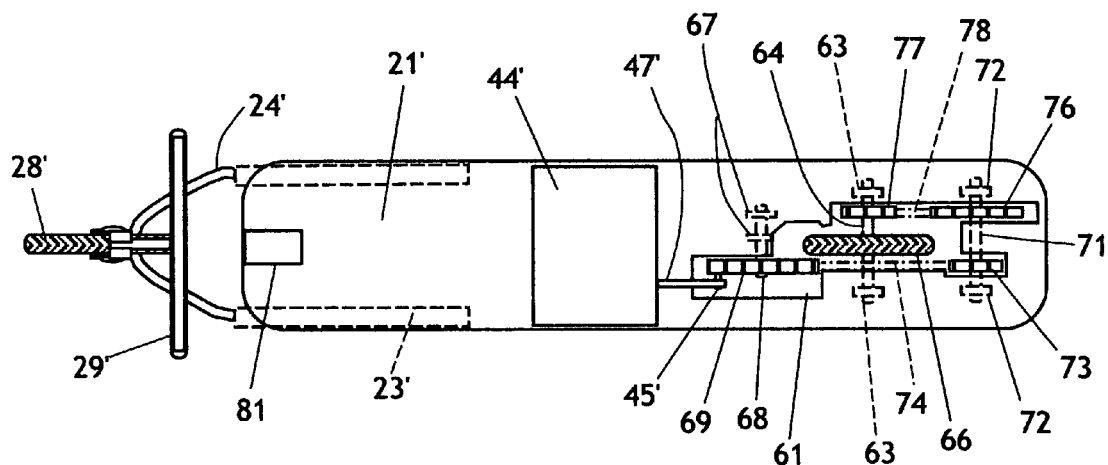
FIG. 4 is a plan view of the embodiment of the mechanically driven scooter shown in FIG. 3.

With regard to FIGS. 3 and 4, another embodiment of the propulsion mechanism of the invention makes use of many of the scooter components enumerated previously, which are accorded the same reference numerals with a prime (') designation. The platform 21' is provided with an irregular slot 61 extending vertically through a rear portion of the platform 21'. A pair of bearing blocks 63 are mounted on the bottom surface of the platform 21', disposed at laterally opposed sides of the slot 21' and at a medial location with respect thereto. The bearing blocks 63 support a wheel axle 64 extending therebetween, and a rear wheel 66 is secured to the axle 64 and disposed within the slot 61. The wheel 66 is oriented in a vertical plane along a longitudinal axis of the scooter, with a portion of the rear wheel projecting upwardly through the slot 61. As noted previously, a freewheel assembly (not shown) may be used to mount the wheel to the axle 64, whereby the wheel will rotate freely when its rotational speed exceeds the rotational speed of axle.

Another pair of bearing blocks 67 are secured to the bottom surface of the platform 21', adjacent to one side of the forward end of slot 61. The bearing blocks 67 support an axle 68 that extends horizontally to span a portion of the slot 61, and a sprocket wheel 69 is mounted on the axle 68 and disposed in the slot 61. A portion of the sprocket wheel 69 projects upwardly through the slot 61. The rigid link 47' is pivotally secured at one end to the bottom surface of the pedal 44', and at the other end it is pivotally joined by an eccentric mounting pin 45' to the sprocket wheel 69. A flexible tension link 48' connects the pedal 44' and platform 21', which limits rotation of the pedal 44' when biased by the spring 46', and rests the pedal 44' at an optimum angle for depression. Thus reiterative depression of the pedal by the scooter rider will cause the sprocket wheel 69 to rotate in continuous fashion.

Another axle 71 is supported by a pair of bearing blocks 72 disposed at opposed sides of the slot 61 and located rearwardly of the rear wheel 66. Secured to the axle 71 is a sprocket wheel 73 that is aligned with sprocket wheel 69, and an endless chain loop 74 is secured about sprocket wheels 69 and 73 to join them in common rotation. Note that the sprocket wheel 73 is substantially smaller than sprocket wheel 69, whereby the former has an angular velocity that is a multiple of the angular velocity of the latter. Another sprocket wheel 76 is secured to the axle 71 for rotation in common therewith. In addition, a sprocket wheel 77 is secured to the wheel axle 64 and aligned with the sprocket wheel 76, and an endless chain loop 78 is secured thereabout for rotation in common. Thus rotation of sprocket wheel 69 is conducted and multiplied by sprocket wheel 73, which is coupled by axle 71 to sprocket wheel 76. Sprocket wheel 76 is substantially larger than sprocket wheel 77, whereby the angular velocity of sprocket wheel 77 is a multiple of the rotational velocity of sprocket wheel 69. Thus the propulsion mechanism is capable of propelling the scooter to travel at a relatively high speed along the ground. The slot 61 allows the larger sprocket wheels 69 and 76 to project upwardly therethrough, so that there is sufficient ground clearance to avoid common ground obstacles. Note that the bearing blocks 63 are extended longer than the bearing blocks 67 and 72. The added length lifts the platform 21' higher off the ground and thus provides more clearance between sprocket wheels 69 and 76 and the ground. As in the previous embodiment, approximately one-half of the propulsion mechanism is located at one side of the rear wheel 66, and the other one-half is located at the other side of the rear wheel, whereby the propulsion mechanism is balanced laterally with respect to the platform 21'. This laterally balanced arrangement provides a compact mechanism which nevertheless enables the use of two endless chain loops, whereby the overall dimensions of the scooter assembly are not unduly large.

The embodiment of FIGS. 3 and 4 may also be provided with a foot brake assembly that includes a brake pedal 81 hingably secured to the upper surface of the platform 21' and located at the forward end thereof. This brake may be provided in place of the typical hand brake lever, or in addition thereto.

It may be appreciated that the design of the propulsion mechanism of either embodiment does not preclude the rider from propelling the scooter in the manner of prior art scooters: standing on the platform on one foot and placing the other foot on the ground to push rearwardly. This technique may be used initially, if desired, and the pedal mechanism may be used thereafter to accelerate and maintain speed.

In both embodiments of the invention, all the propulsion components are mounted on the bottom surface of the platform, so that they do not interfere with the rider's feet. The slot enables the larger components to project upwardly through the platform, whereby ground clearance is enhanced, thus providing an optimum arrangement for ground clearance and rider support space on the platform. The gear wheels or sprocket wheels may be provided with guards or housings (not shown) to prevent contact therewith by the feet of the rider.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a scooter having a platform for supporting a rider and front and rear wheels for ground-engaging rolling translation, an improved propulsion mechanism, including:
   a wheel axle mounted on the bottom surface of the platform, and a rear wheel secured to said wheel axle;
   a plurality of rotating propulsion components, including at least one secured to said wheel axle;
   means for mounting said rotating propulsion components on the bottom surface of the platform;
   a slot extending vertically in the platform, through which at least one of said rotating propulsion components extend upwardly to enable sufficient ground clearance;

a pedal mounted on the upper surface of the platform, and a rigid link extending from said pedal to said rotating propulsion components to turn said rotating propulsion components and propel the scooter;

a first axle mounted on the bottom surface of the platform, a first gear wheel secured on said first axle, said rigid link secured eccentrically to said first gear wheel to rotate said first gear wheel in concert with reiterative depression of said pedal;

a second axle mounted on the bottom surface of the platform rearwardly of said first axle, and a second gear wheel mounted on said second axle and disposed to mesh with said first gear wheel;

further including a third gear wheel secured to said second axle for rotation in common therewith, and a fourth gear wheel secured to said wheel axle for rotation in common therewith, said third and fourth gear wheels disposed to mesh and rotate together;

said rear wheel being aligned with a longitudinal axis of the scooter, and said first and second gear wheels being disposed offset to one side of the longitudinal axis, and said third and fourth gear wheels are disposed offset to the other side of the longitudinal axis.

2. The scooter propulsion mechanism of claim 1, wherein a portion of said rear wheel projects upwardly through said slot in the platform.

3. The scooter propulsion mechanism of claim 1, wherein said first gear wheel is larger in diameter than said second gear wheel, and said third gear wheel is larger in diameter than said fourth gear wheel, whereby the angular velocity of the rear wheel is greater than the angular velocity of said first gear wheel.

4. The scooter propulsion mechanism of claim 3, wherein portions of said first and third gear wheels project upwardly through said slot.

5. The scooter propulsion mechanism of claim 1, wherein said wheel axle is disposed rearwardly of said first and second axles.

* * * * *